(12) United States Patent
Van de Veerdonk

(10) Patent No.: US 9,349,406 B2
(45) Date of Patent: May 24, 2016

(54) COMBINING FEATURES USING DIRECTED SELF-ASSEMBLY TO FORM PATTERNS FOR ETCHING

(71) Applicant: Seagate Technology LLC, Cupertino, CA (US)

(72) Inventor: Rene Johannes Marinus Van de Veerdonk, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/621,299

(22) Filed: Feb. 12, 2015

(65) Prior Publication Data

US 2015/0154997 A1 Jun. 4, 2015

Related U.S. Application Data

(62) Division of application No. 13/363,039, filed on Jan. 31, 2012, now abandoned.

(51) Int. Cl.
| | | |
|---|---|---|
| *B44C 1/22* | (2006.01) | |
| *C23F 3/00* | (2006.01) | |
| *G11B 5/84* | (2006.01) | |
| *C25F 3/00* | (2006.01) | |
| *C23F 4/00* | (2006.01) | |

(52) U.S. Cl.
CPC ... *G11B 5/84* (2013.01); *C23F 4/00* (2013.01); *C25F 3/00* (2013.01)

(58) Field of Classification Search
USPC .............................................. 216/22, 40, 11
See application file for complete search history.

(56) References Cited

U.S. PATENT DOCUMENTS

| | | | | |
|---|---|---|---|---|
| 7,767,099 B2* | 8/2010 | Li | ................. | H01L 21/0337 216/17 |
| 8,114,300 B2* | 2/2012 | Millward | ................. | B05D 1/34 216/17 |
| 2011/0045406 A1* | 2/2011 | Keszler | ................. | H01L 29/4908 430/270.1 |
| 2011/0200795 A1* | 8/2011 | Lammers | ................. | B82Y 10/00 428/195.1 |
| 2011/0242706 A1* | 10/2011 | Sakurai | ................. | B82Y 10/00 360/264.1 |
| 2012/0107583 A1* | 5/2012 | Xiao | ................. | G03F 7/0002 428/210 |
| 2012/0135159 A1* | 5/2012 | Xiao | ................. | B81C 1/00031 427/534 |
| 2013/0266727 A1* | 10/2013 | Peeters | ................. | B82Y 10/00 427/248.1 |

OTHER PUBLICATIONS

Ion Bita, et al., "Graphoepitaxy of Self-Assembled Block Copolymers on Two-Dimensional Periodic Patterned Templates" Science vol. 321, p. 939-943, Aug. 15, 2008 (sciencemag.org).

* cited by examiner

*Primary Examiner* — Shamim Ahmed

(57) ABSTRACT

Provided herein is a method, including etching a first pattern into a mask, wherein the first pattern includes a first set of features corresponding to features of an imprint template; forming a second set of features over and in-between the first set of features by directed self-assembly of a block copolymer composition, wherein the first and second sets of features combine to form a second pattern; and etching the second pattern into a substrate.

20 Claims, 14 Drawing Sheets

COMBINING FEATURES USING DIRECTED SELF-ASSEMBLY TO FORM PATTERNS FOR ETCHING

CROSS REFERENCE

This application is a division of U.S. patent application Ser. No. 13/363,039, filed Jan. 31, 2012, which is incorporated herein by reference in its entirety.

BACKGROUND

Bit patterned media (BPM) disk manufacturing includes fabricating master-templates. Fabricating master-templates includes nano-imprint lithography processes. Nano-imprint lithography includes self-assembly processes to create high density patterns. Self-assembly processes create regular patterns such as hexagonal close packed or square structures used for creating BPM data-patterns. Two or more pattern overlay processes are added to create BPM of servo-patterns. Overlay misalignments create inaccuracies in the master templates.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a method of self-aligned fully integrated stack fabrication is described for illustrative purposes and the underlying system can apply to any number and multiple types of stacks and servo-information. In one embodiment the method of self-aligned fully integrated stack fabrication can be configured using numerous etching and guided self assembly processes. The method of self-aligned fully integrated stack fabrication can be configured to include large servo-field patterns that include servo information and can be configured to include small servo-field patterns that include servo information using the present invention.

Figure 1:
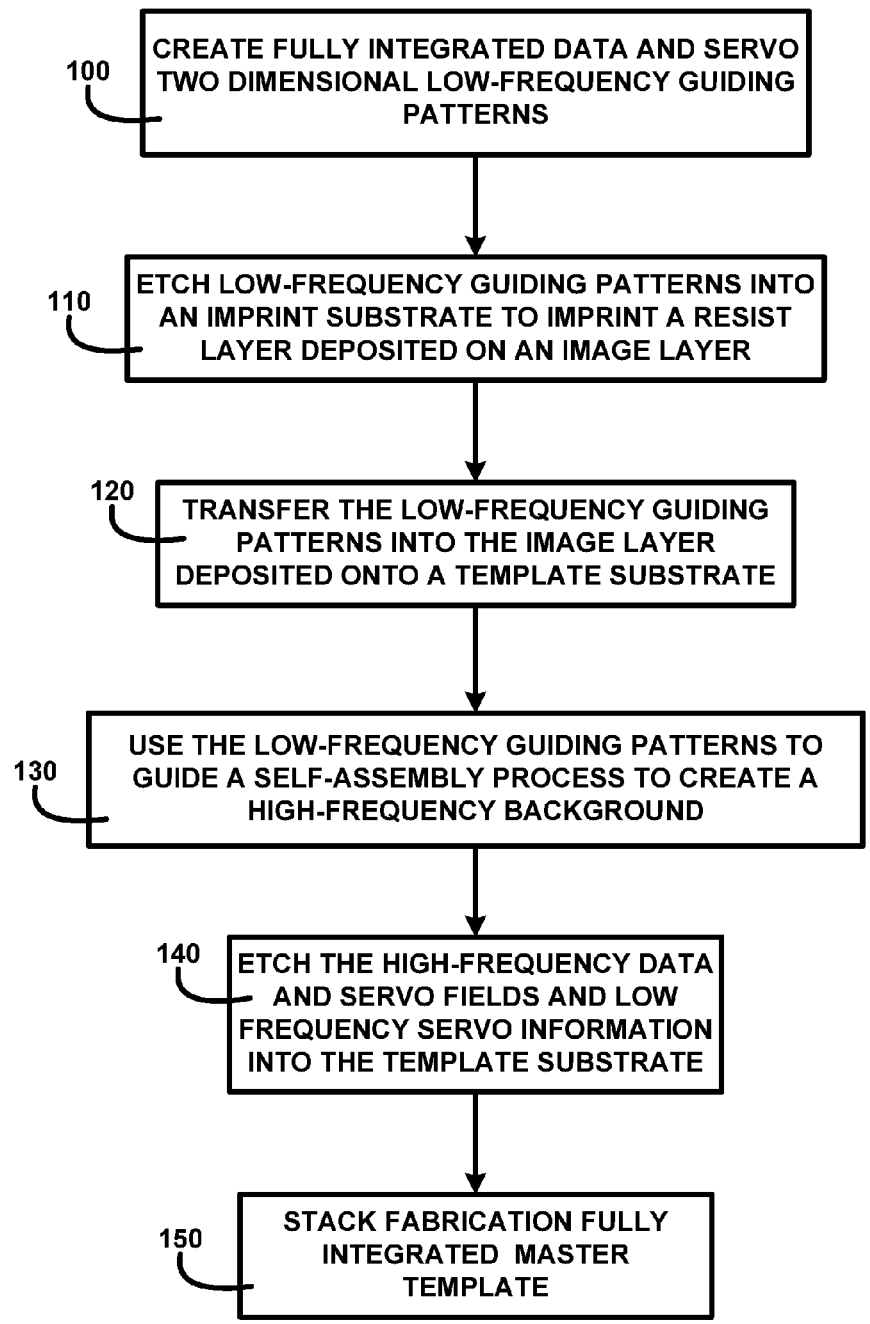
FIG. 1 shows a block diagram of an overview of a method of self-aligned fully integrated stack fabrication of one embodiment.

FIG. 1 shows a block diagram of an overview of a method of self-aligned fully integrated stack fabrication of one embodiment. FIG. 1 shows the method of self-aligned fully integrated stack fabrication uses a self-aligned fully integrated lithography scheme that avoids overlay steps to create separate data and servo field guiding patterns. The method of self-aligned fully integrated stack fabrication is used to create fully integrated data and servo two dimensional low-frequency guiding patterns 100. The two dimensional low-frequency guiding patterns for the data-fields include traditional sparse hexagonal guiding structures. Larger servo-field patterns guiding structures are created to be compatible with the natural patterns of the low-frequency data-field guiding patterns including the sparse hexagonal guiding structures of one embodiment.

The low-frequency data-field and larger servo information guiding structures are combined into one integrated set of guiding patterns to avoid using overlays of separate data and servo patterns which may cause inaccuracies during the stack fabrication process. The combined integrated set of guiding patterns enables encoding servo information into the low-frequency servo-field patterns at the same time for transfer into the stack during fabrication of one embodiment.

A process is used to etch low-frequency guiding patterns into an imprint substrate to imprint a resist layer deposited on an image layer 110. The imprinted resist layer is used to transfer the low-frequency guiding patterns into the image layer deposited onto a template substrate 120. A single or multi-layered image layer is deposited onto the template substrate. A wet reverse-tone process or a dry reverse-tone process is used to transfer the low-frequency guiding patterns into the image layer. The processes continue to use the low-frequency guiding patterns to guide a self-assembly process to create a high-frequency background 130. The guided self-assembly process creates a high-frequency background in the data-fields and at the same time creates high-frequency background servo-fields that include the low-frequency encoded servo information. The concurrently created fully integrated data and servo fields can be effectively planarized of one embodiment.

In another embodiment a direct-etch process is used to transfer the low-frequency guiding patterns directly into the image layer. A subsequent guided self-assembly process is used to create a high-frequency background of the data-fields and at the same time create the low-frequency encoded servo-fields of one embodiment.

The method of self-aligned fully integrated stack fabrication continues with a process to etch the high-frequency data and servo fields and low frequency servo information into the template substrate 140. The etched substrate including the high-frequency data patterns and the low frequency servo patterns forms a fully integrated stack fabrication master template 150 of one embodiment.

DETAILED DESCRIPTION

Low-Frequency Guiding Patterns

Figure 2A:
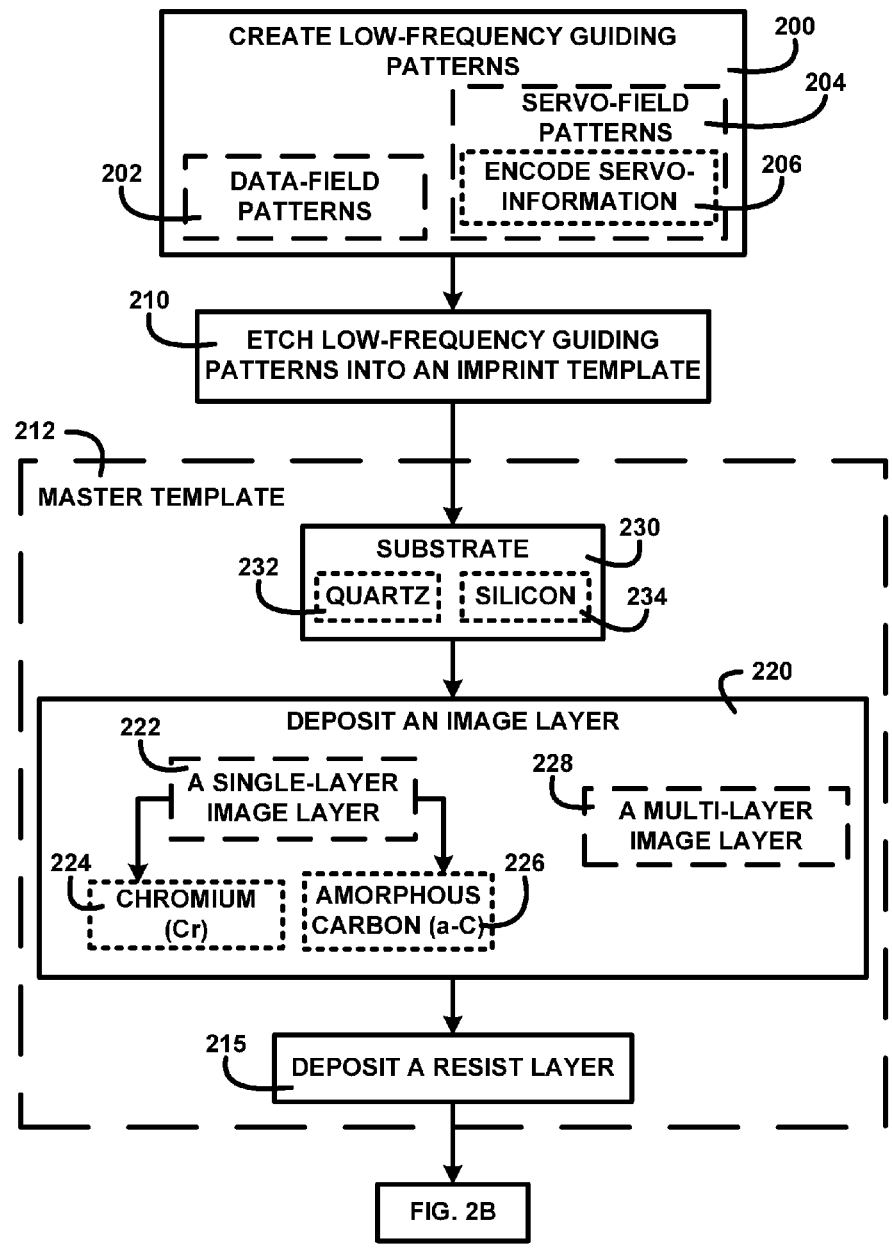
FIG. 2A shows a block diagram of an overview flow chart of a method of self-aligned fully integrated stack fabrication of one embodiment.

FIG. 2A shows a block diagram of an overview flow chart of a method of self-aligned fully integrated stack fabrication of one embodiment. FIG. 2A shows the method of self-aligned fully integrated stack fabrication begins to create low-frequency guiding patterns 200. The low-frequency guiding patterns include data-field patterns 202 and larger servo-field patterns 204. The creation of the larger servo-field patterns 204 may include a process to encode servo-information 206. The process continues to etch low-frequency guiding patterns into an imprint template 210. The imprint template is used to transfer the low-frequency guiding patterns into a nano-imprint lithography master-template 212 of one embodiment.

The master-template 212 is formed using a substrate 230 using a material such as quartz 232 or silicon 234. The next step is to deposit an image layer 220 onto the substrate 230. The image layer may include a single-layer image layer 222 using materials such as chromium (Cr) 224 or amorphous carbon (a-C) 226. The image layer may include a multi-layer image layer 228. The next process step is to deposit a resist layer 215 onto the image layer. The description of the processes continues in FIG. 2B of one embodiment.

Figure 2B:
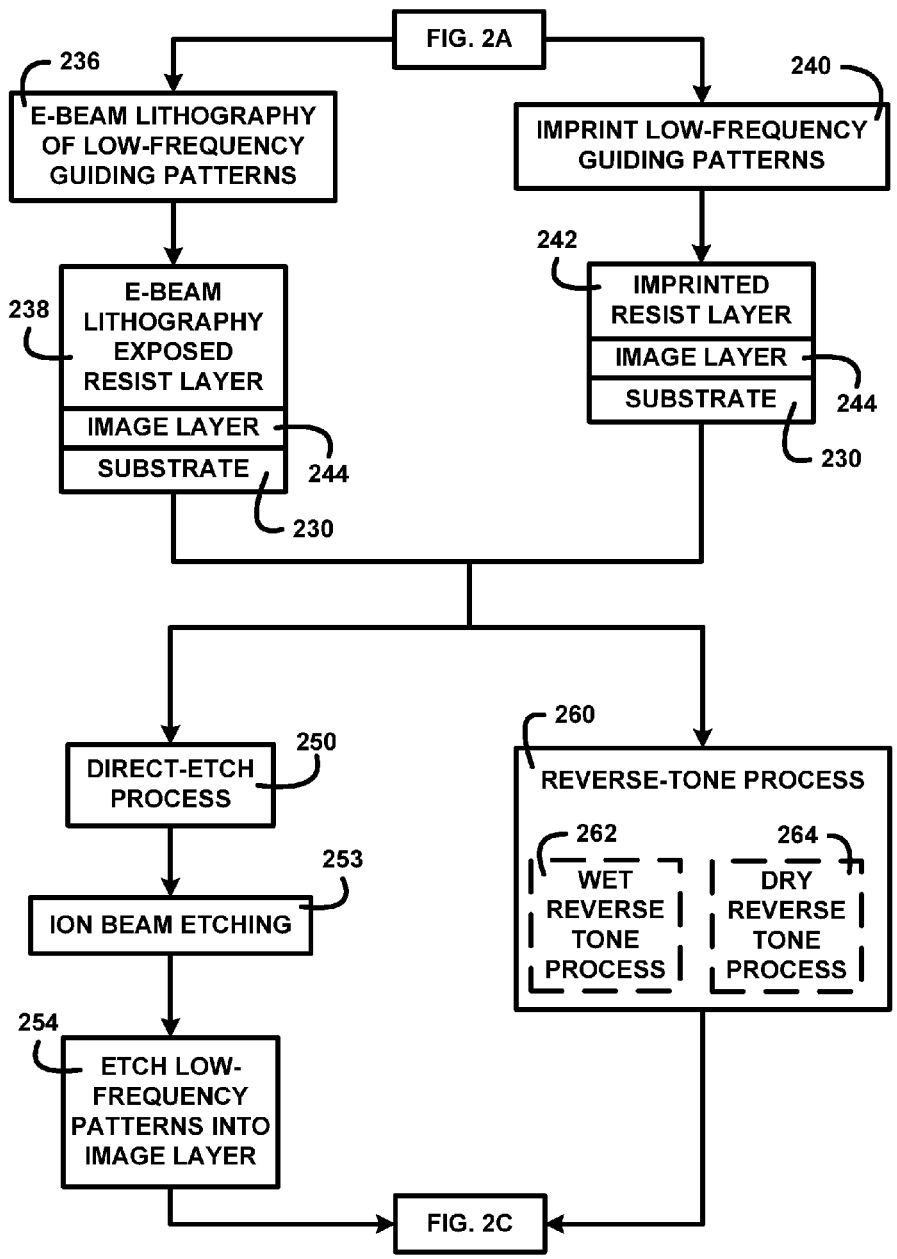
FIG. 2B shows a block diagram of a continuation of an overview flow chart of a method of self-aligned fully integrated stack fabrication of one embodiment.

Imprinting the Low-Frequency Guiding Patterns:

FIG. 2B shows a block diagram of a continuation of an overview flow chart of a method of self-aligned fully integrated stack fabrication of one embodiment. The process continues from FIG. 2A including the low-frequency guiding patterns imprint template and the nano-imprint lithography master-template. In one embodiment the imprint template is used to imprint low-frequency guiding patterns 240 into the resist layer. The imprinted resist layer 242 is cured and may include a descum process. The imprinted resist layer 242 sets on the image layer 244 and substrate 230 of one embodiment.

In another embodiment e-beam lithography of low-frequency guiding patterns 236 can be used to transfer the guiding patterns to the resist layer. E-beam lithography by emitting a beam of electrons following the low-frequency guiding patterns exposes the resist layer. An e-beam lithography exposed resist layer 238 can be developed by removing for example the non-exposed areas of the resist layer materials which for example can be removed using a chemical etching process of one embodiment.

The transfer of the low-frequency guiding patterns using processes such as the imprint template or e-beam lithography form the topography of the low-frequency guiding patterns in the resist layer on top of the image layer 244 and substrate 230. In one embodiment a direct-etch process 250 using a process such as ion beam etching 253 is used to etch low-frequency patterns into image layer 254 directly. In another embodiment a reverse-tone process 260 is performed using a wet reverse tone process 262 or dry reverse tone process 264 to transfer the low-frequency guiding patterns into image layer 244. A continuation of the processing is shown in FIG. 2C of one embodiment.

Figure 2C:
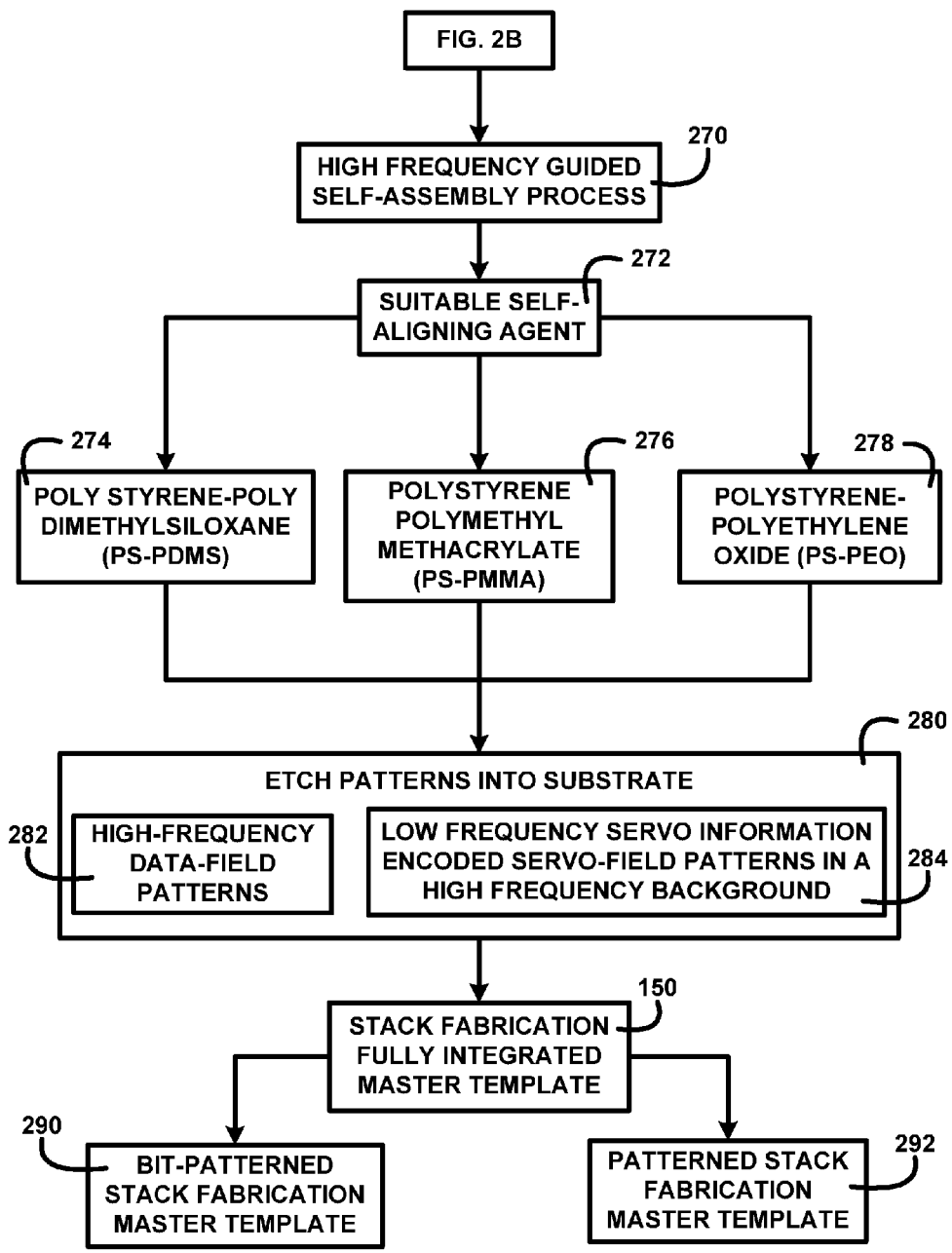
FIG. 2C shows a block diagram of a continuation of an overview flow chart of a method of self-aligned fully integrated stack fabrication of one embodiment.

Guided Self-Assembly Process:

FIG. 2C shows a block diagram of a continuation of an overview flow chart of a method of self-aligned fully integrated stack fabrication of one embodiment. FIG. 2C shows the continuation of the processes from FIG. 2B. A high frequency guided self-assembly process 270 uses a suitable self-aligning agent 272 to create a high-frequency background. A suitable self-aligning agent 272 such as Poly Styrene-Poly Dimethylsiloxane (PS-PDMS) 274, Polystyrene Polymethyl Methacrylate (PS-PMMA) 276 or Polystyrene-Polyethylene Oxide (PS-PEO) 278 is used to create high density frequency based on the low-frequency data-field guiding patterns. The structures of the high-frequency data-field patterns 282 may be formed on top of other structures such as etched or imprinted low-frequency patterns. The raised structures produced in the guided self-assembly process are effectively planarized including the low-frequency servo structures. The remaining portions of the high density structures and etched image layer form a mask for an etching process such as e-beam lithography of one embodiment.

The process continues with a step to etch patterns into substrate 280. The etching transfers the high-frequency data-field patterns 282 and the low frequency servo information encoded servo-field patterns in a high frequency background 284 into the substrate material. The remaining portions of the layers deposited on the substrate are removed and the etched substrate cleaned. The remaining etched substrate forms a fully integrated stack fabrication master template 150. The method of self-aligned fully integrated stack fabrication can be used to produce a bit-patterned stack fabrication master template 290 or any other patterned stack fabrication master template 292 of one embodiment.

Figure 3A:
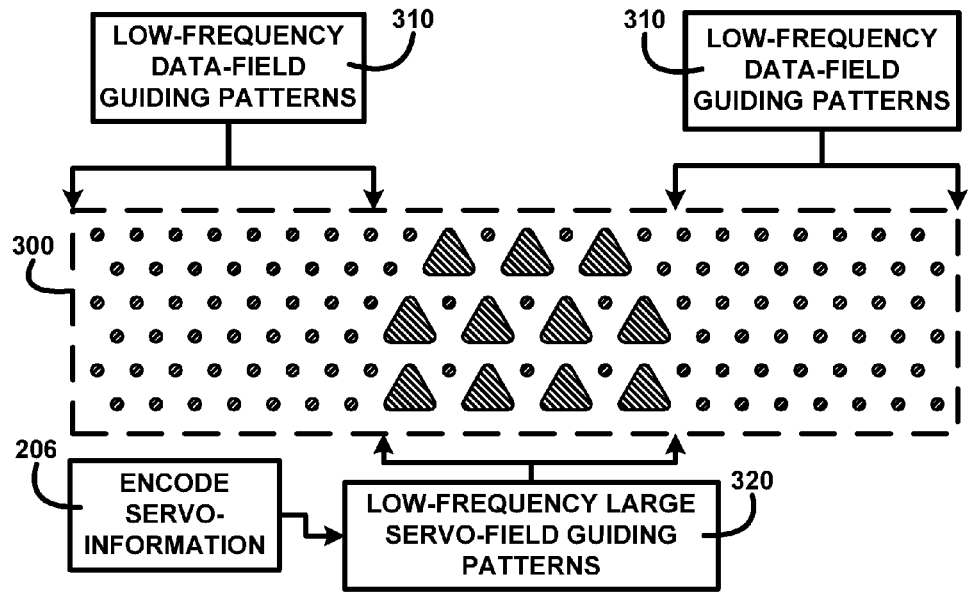
FIG. 3A shows for illustrative purposes only an example of low frequency large servo and data field guiding patterns of one embodiment.

Low-Frequency Large Servo-Field Guiding Patterns:

FIG. 3A shows for illustrative purposes only an example of low frequency large servo and data field guiding patterns of one embodiment. FIG. 3A shows the combined fully integrated low-frequency two dimensional guiding patterns 300. The two dimensional low-frequency guiding patterns include low-frequency data-field guiding patterns 310. The low-frequency data-field guiding patterns 310 can be written based on traditional sparse hexagonal guiding structures for the data-fields or other low-frequency guiding structures for example guiding structures which use guided self assembly processes to create a high density of one embodiment.

The combined fully integrated low-frequency two dimensional guiding patterns 300 also include low-frequency large servo-field guiding patterns 320. The low-frequency large servo-field guiding patterns 320 are chosen to be compatible with the natural patterns create by the traditional sparse hexagonal guiding structures for the data-fields. A process to encode servo-information 206 into the low-frequency large servo-field guiding patterns 320 can be used to pattern the servo-information into a stack during the fabrication process. The combined fully integrated low-frequency two dimensional guiding patterns 300 avoids overlaying separate data-field and servo-field patterns which may cause inaccuracies due to miss-positioning of the overlays of one embodiment.

Figure 3B:
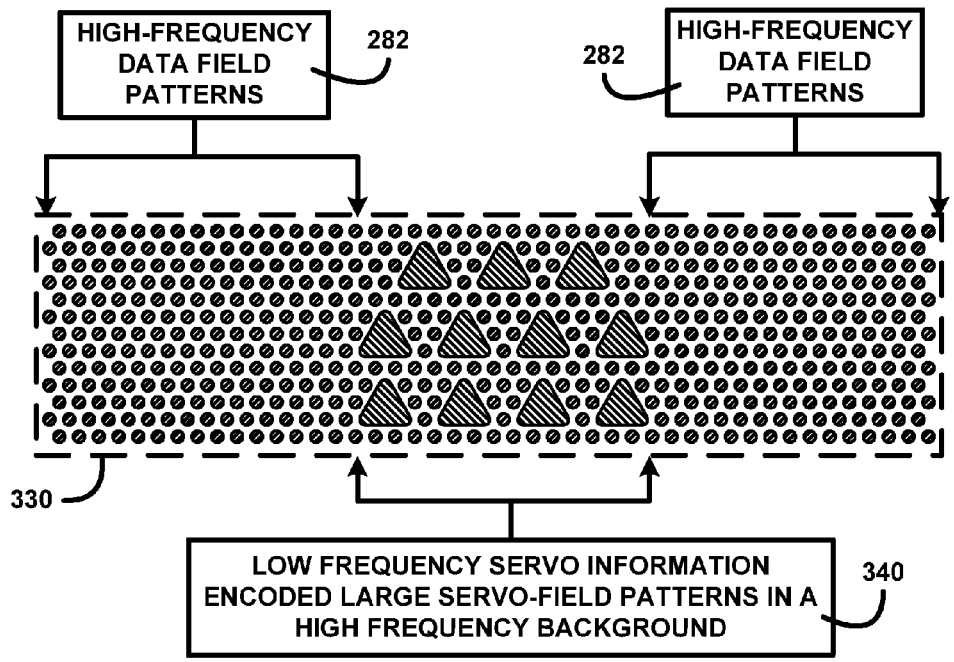
FIG. 3B shows for illustrative purposes only an example of a low frequency large encoded servo field patterns in a high frequency data field background of one embodiment.

High-Frequency Large Servo-Field Master Template:

FIG. 3B shows for illustrative purposes only an example of a low frequency large encoded servo field patterns in a high frequency data field background of one embodiment. FIG. 3B shows a large servo-field high-frequency master template 330 into which have been etched the high-frequency data field patterns 282 and low frequency large servo information encoded servo field patterns in a high frequency background 340. The high-frequency data field patterns 282 are the result of the guided self assembly process. The guided self assembly process is used to create a high density of data-fields structures from the low-frequency data-field guiding patterns 310 of FIG. 3A of the combined fully integrated low-frequency two dimensional guiding patterns 300 of FIG. 3A of one embodiment.

Low-Frequency Large Servo Field Guiding Patterns Transfer Process:

FIG. 4, FIG. 5, FIG. 6 and FIG. 7 show the processes used in one embodiment to transfer the low-frequency guiding patterns to create a high-frequency master template. The low-frequency guiding patterns illustrated in FIG. 4, FIG. 5, FIG. 6 and FIG. 7 include for example large servo field guiding patterns. The one embodiment illustrated shows one of various combinations of processes such as e-beam lithography, guided self-assembly processes and direct-etch processes using the two dimensional low-frequency guiding patterns used to create a fully integrated stack fabrication master template of one embodiment.

Figure 4:
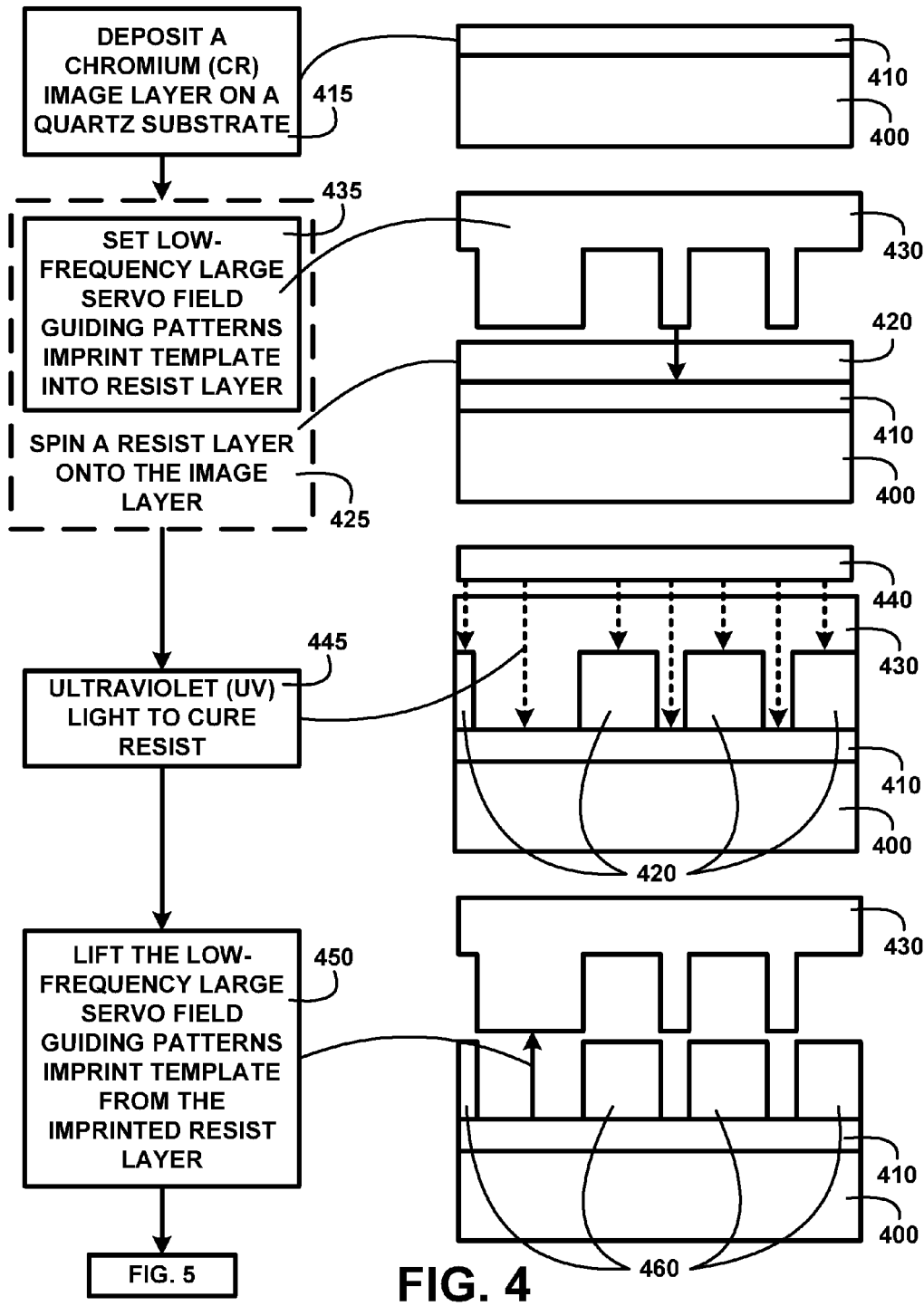
FIG. 4 shows for illustrative purposes only an example of low-frequency large servo field guiding patterns transfer process of one embodiment.

FIG. 4 shows for illustrative purposes only an example of low-frequency large servo field guiding patterns transfer process of one embodiment. FIG. 4 shows a process to deposit a chromium (Cr) image layer on a quartz substrate 415. The quartz substrate 400 and chromium (Cr) image layer 410 forms the base of the template used to create the master template of one embodiment.

The process proceeds to spin a resist layer onto the image layer 425. The low-frequency large servo field guiding patterns are etched into a substrate to create a low-frequency large servo field guiding patterns imprint template 430. The resist layer 420 is used to imprint the low-frequency large servo field guiding patterns. The next step in the imprinting process is to set low-frequency large servo field guiding patterns imprint template into resist layer 435 of one embodiment.

An ultraviolet (UV) light source 440 is used to project ultraviolet (UV) light through the low-frequency large servo field guiding patterns imprint template 430 to the resist layer. The resist through capillary action fills the cavities of the low frequency guiding patterns. The process to use ultraviolet (UV) light to cure resist 445 material sets the low-frequency large servo field guiding patterns into the resist to form an imprinted resist layer 460. A process to lift the low-frequency large servo field guiding patterns imprint template from the imprinted resist layer 450 is completed to reveal the imprinted resist layer 460. The continuation of the processes is described in FIG. 5 of one embodiment.

Figure 5:
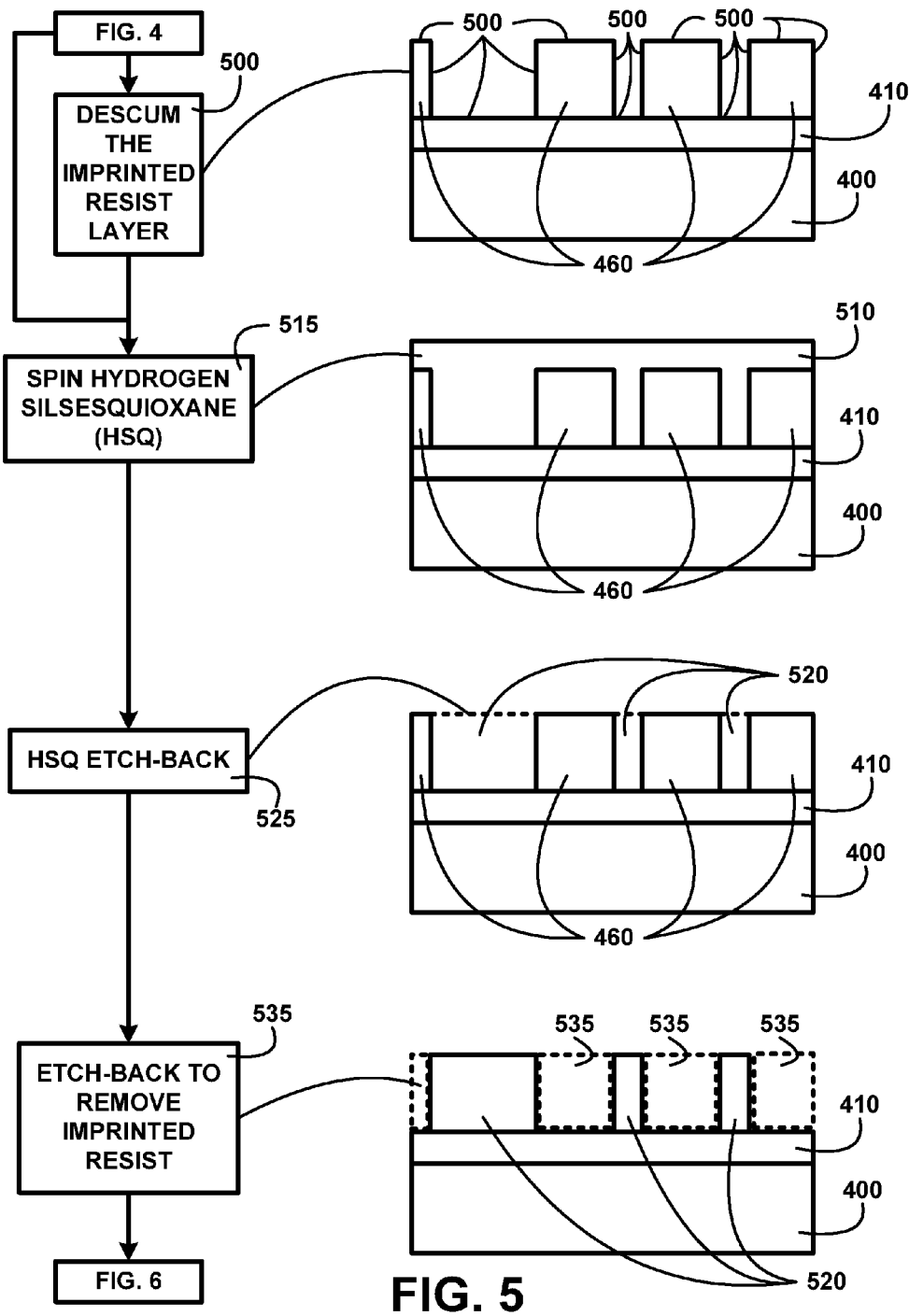
FIG. 5 shows for illustrative purposes only an example of HSQ large servo etching mask process of one embodiment.

HSQ Large Servo Etching Masks Process:

FIG. 5 shows for illustrative purposes only an example of HSQ large servo etching mask process of one embodiment. FIG. 5 shows the continuation processes from FIG. 4. The next step may include a process to descum the imprinted resist layer 500. The next step is to spin hydrogen silsesquioxane (HSQ) 515 on the imprinted resist layer 460 using a HSQ-based wet reverse tone process. The HSQ 510 fills the voids of the imprinted resist layer 460 from the surface of the chromium (Cr) image layer 410 to a level above the imprinted resist layer 460 of one embodiment.

The spun HSQ 510 hardens and then is planarized. A HSQ etch-back 525 is used to planarize the HSQ 510. The planarization of the HSQ is achieved using processes such as chemical etching or mechanical planarization. The planarized HSQ 520 matches the upper surface level of the imprinted resist layer 460. An etch-back to remove imprinted resist 535 is processed to reveal the reverse tone planarized HSQ 520. Subsequent processes are described in FIG. 6 of one embodiment.

Figure 6:
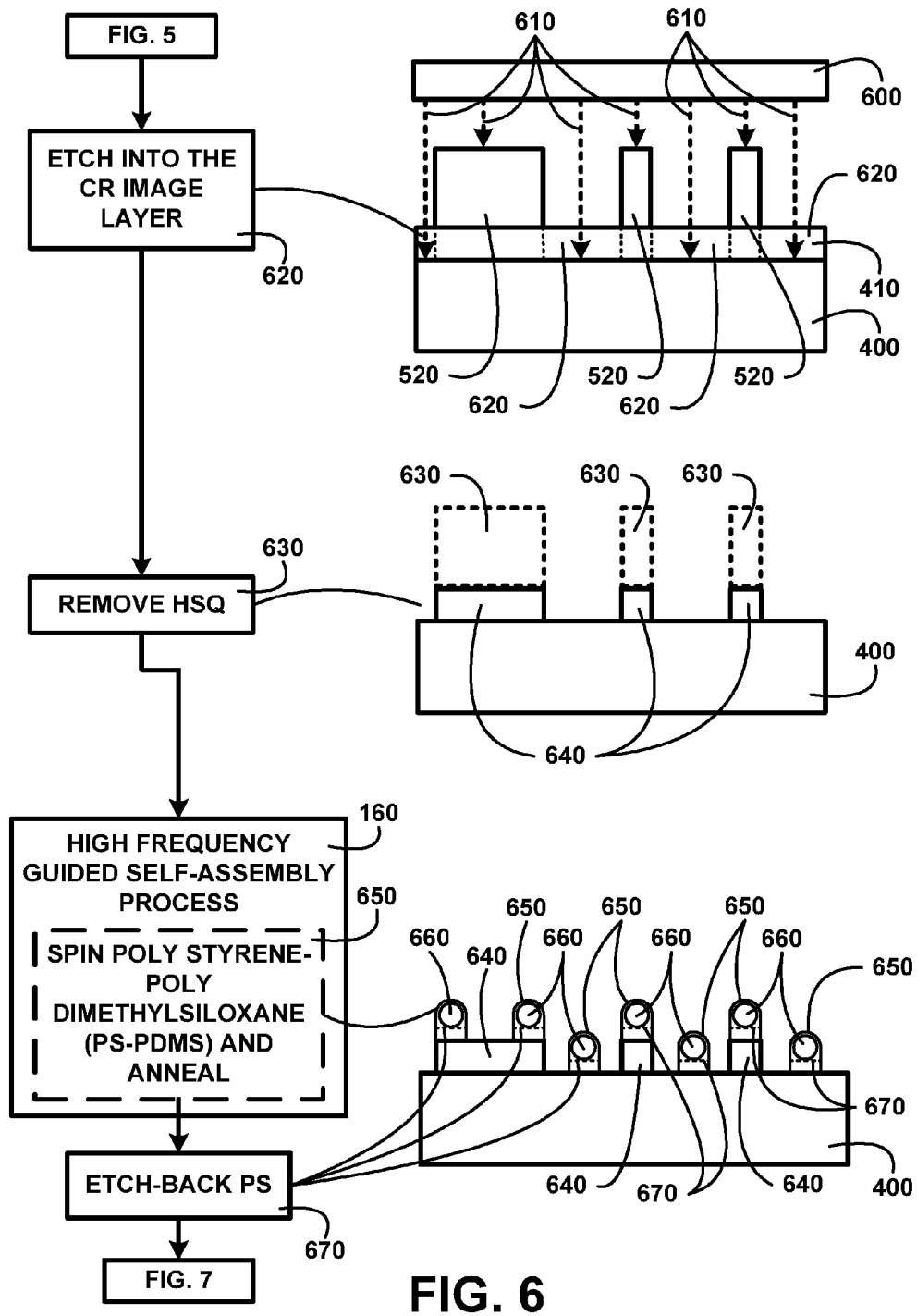
FIG. 6 shows for illustrative purposes only an example of a large servo high frequency guided self-assembly process of one embodiment.

Large Servo High Frequency Guided Self-Assembly Process:

FIG. 6 shows for illustrative purposes only an example of a large servo high frequency guided self-assembly process of one embodiment. A physical or chemical guide-pattern can be used to enforce long-range order during the self assembly process of block-copolymers, or other self-assembling agents such as nano-particles. It has been demonstrated that this approach can result in large arrays of, for example, round dots in a hexagonally close-packed or square arrangement of one embodiment.

Continuing from the processes described in FIG. 5, FIG. 6 shows the next step is to etch into the Cr image layer 620 the low-frequency guiding patterns using a process such as e-beam lithography. An e-beam writer 600 projects e-beams 610 which pass through the areas where the imprinted resist layer 460 of FIG. 4 have been removed. The e-beams 610 etch the low frequency patterns into the chromium (Cr) image layer 410 to the surface of the quartz substrate 400. The reverse tone planarized HSQ 520 is resistant to the e-beam etching. A chemical etch back process is used to remove HSQ 630. The etched chromium (Cr) image layer 640 is revealed and portions of the quartz substrate 400 exposed of one embodiment.

A high frequency guided self-assembly process 160 is used to spin poly styrene-poly dimethylsiloxane (PS-PDMS) and anneal 650 the material to harden the high density structures. The highest portions of the high density structures consist of poly styrene (PS) 660. A chemical process is used to etch-back PS 670. The etched chromium (Cr) image layer 640 and remaining high frequency PDMS structures form a mask in subsequent etching processes. Processes described in FIG. 7 show the continuing process of one embodiment.

Figure 7:
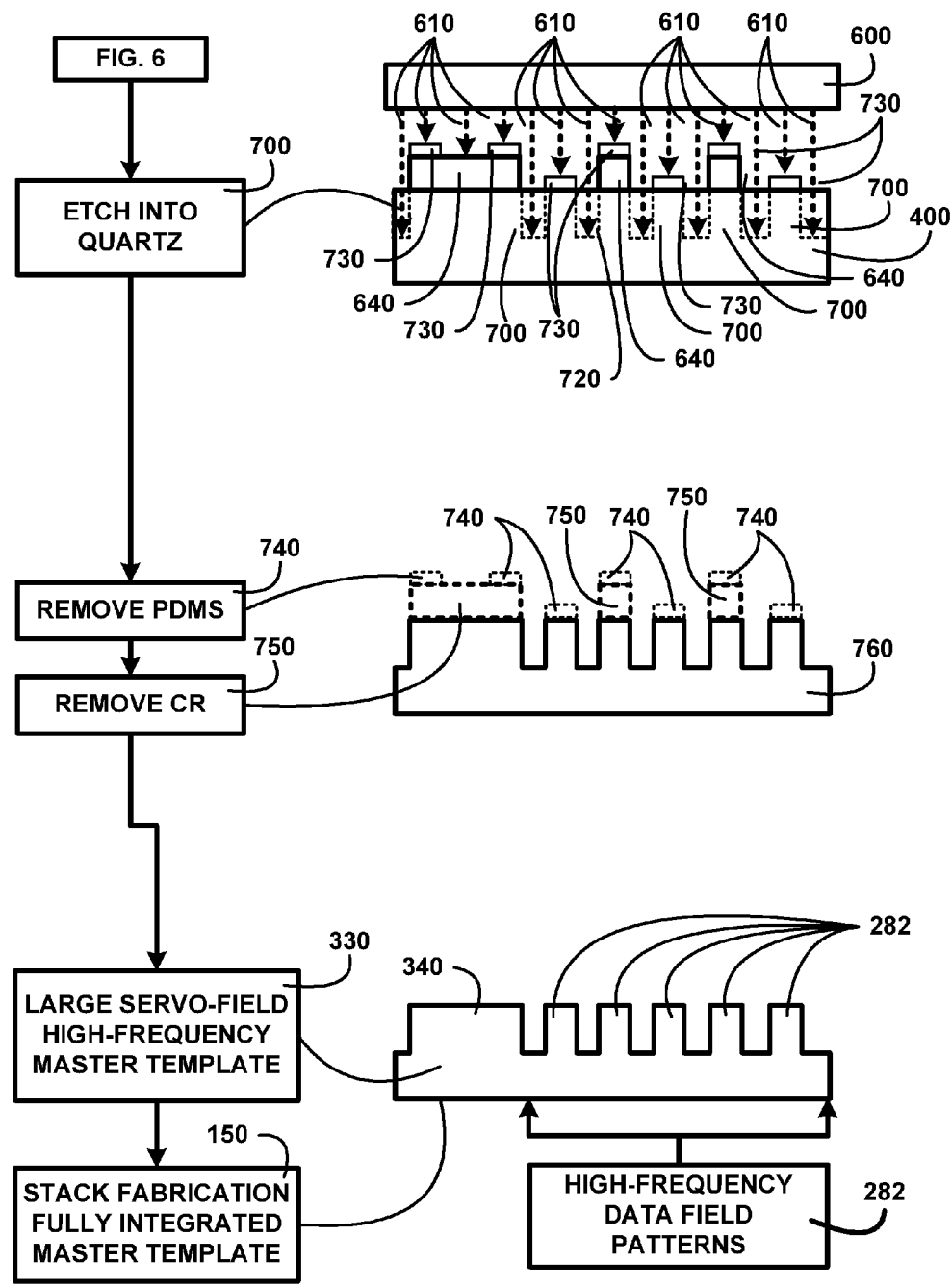
FIG. 7 shows for illustrative purposes only an example of a large servo stack fabrication master template process of one embodiment.

Large Servo Stack Fabrication Master Template Process:

FIG. 7 shows for illustrative purposes only an example of a large servo stack fabrication master template process of one embodiment. The etched chromium (Cr) image layer 640 and remaining high frequency PDMS structures masks formed in FIG. 6 expose portions of the surface of the quartz substrate 400. A process such as e-beam lithography is used to etch into quartz 700. The e-beam writer 600 projects e-beams 610 which etch into the exposed surfaces of the quartz substrate 400. Upon completion of the e-beam etching of the quartz etch back processes are used to remove the PDMS 730 structures and remove Cr 750 in the etched chromium (Cr) image layer 640. The etched quartz substrate 760 is cleaned of one embodiment.

The etched quartz substrate 760 forms the large servo-field high-frequency master template 330. The low frequency large servo information encoded servo field patterns in a high frequency background 340 and high-frequency data field patterns 282 form the fully integrated stack fabrication master template 150. The use of the method of self-aligned fully integrated stack fabrication produces a highly accurate fully integrated stack fabrication master template 150 to fabricate bit-patterned stacks and any other patterned stack media of one embodiment.

Figure 8A:
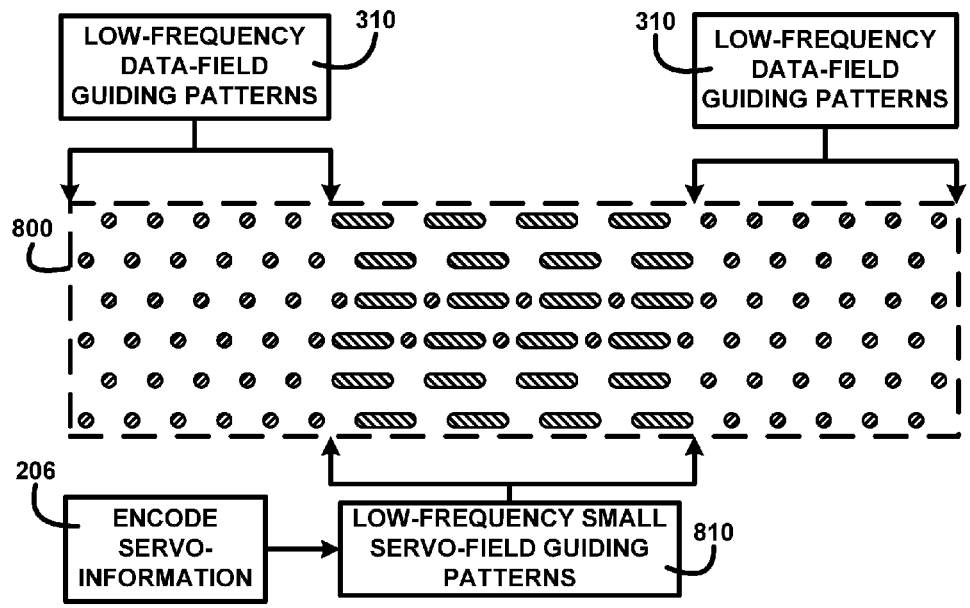
FIG. 8A shows for illustrative purposes only an example of low frequency small servo and data field guiding patterns of one embodiment.

Low-Frequency Small Servo-Field Guiding Patterns:

FIG. 8A shows for illustrative purposes only an example of low frequency small servo and data field guiding patterns of one embodiment. FIG. 8A shows one embodiment of the combined fully integrated low-frequency two dimensional guiding patterns 800. The two dimensional low-frequency guiding patterns include low-frequency data-field guiding patterns 310. The low-frequency data-field guiding patterns 310 can be written based on hexagonal close packed or square guiding structures for the data-fields or other low-frequency guiding structures for example guiding structures which use guided self assembly processes to create a high density of one embodiment.

The combined fully integrated low-frequency two dimensional guiding patterns 800 also include low-frequency small servo-field guiding patterns 810. The low-frequency small servo-field guiding patterns 810 illustrated are chosen to be compatible with the natural patterns create by the square guiding structures for the data-fields. A process to encode servo-information 206 into the low-frequency small servo-field guiding patterns 810 can be used to pattern the servo-information into a stack during the fabrication process of one embodiment.

Figure 8B:
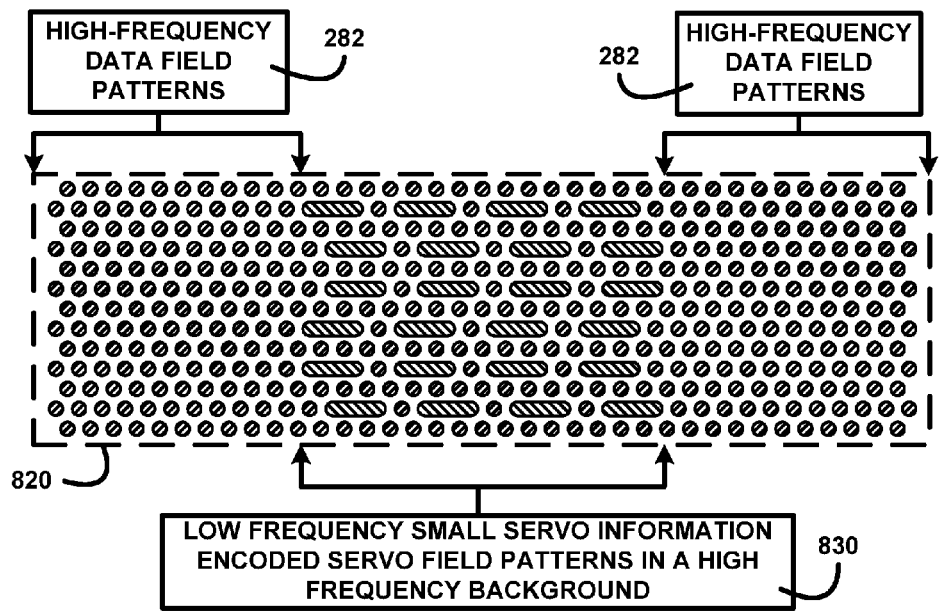
FIG. 8B shows for illustrative purposes only an example of a low frequency small information servo field patterns encoded in a high frequency data field background of one embodiment.

High-Frequency Small Servo-Field Master Template:

FIG. 8B shows for illustrative purposes only an example of a low frequency small information servo field patterns encoded in a high frequency data field background of one embodiment. FIG. 8B shows a small servo-field high-frequency master template 820 into which have been etched the high-frequency data field patterns 282 and low frequency small servo information encoded servo field patterns in a high frequency background 830. The high-frequency data field patterns 282 are the result of the guided self assembly process using the low-frequency data-field guiding patterns 310 of FIG. 8A from the combined fully integrated low-frequency two dimensional guiding patterns 800 of FIG. 8A to create a high density of data-fields structures of one embodiment.

Figure 9:
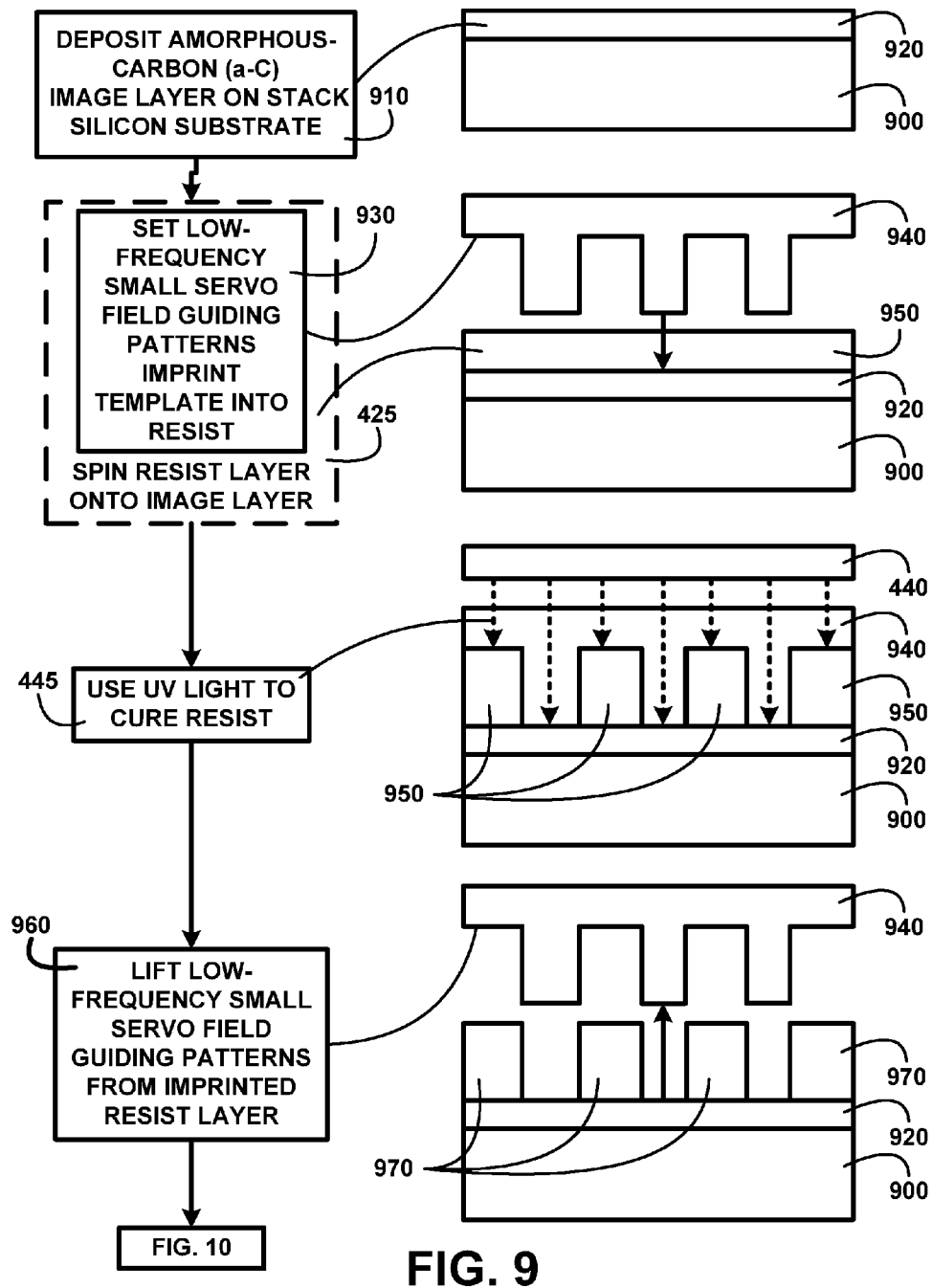
FIG. 9 shows for illustrative purposes only an example of low-frequency small servo field guiding patterns transfer process of one embodiment.

Low-Frequency Small Servo Field Guiding Patterns Transfer Process:

FIG. 9 shows for illustrative purposes only an example of low-frequency small servo field guiding patterns transfer process of one embodiment. FIG. 9 shows the formation of the base of a master template using a silicon substrate 900. A process is used to deposit amorphous-carbon (a-C) image layer on stack silicon substrate 910. An amorphous-carbon (a-C) image layer 920 is used in the transfer of the low-frequency small servo field guiding patterns into the silicon substrate 900 of one embodiment.

A low-frequency small servo guiding patterns imprint template 940 is created by etching the low-frequency small servo guiding patterns into a substrate. The transfer process proceeds to spin resist layer onto image layer 425. The next step is to set low-frequency small servo field guiding patterns imprint template into resist 930. The resist layer 950 through capillary action fills the cavities of the low frequency guiding patterns of one embodiment.

An ultraviolet (UV) light source 440 is used to project ultraviolet (UV) light through the low-frequency small servo guiding patterns imprint template 940 to the resist layer 950. The process to use ultraviolet (UV) light to cure resist 445 material sets the low-frequency small servo field guiding patterns into the resist to form an imprinted resist layer 970. A process to lift the low-frequency small servo guiding patterns imprint template 940 from the resist layer 950 is completed to reveal the imprinted resist layer 970 and portions of the surface of the amorphous-carbon (a-C) image layer 920. The continuation of the processes is described in FIG. 10 of one embodiment.

Figure 10:
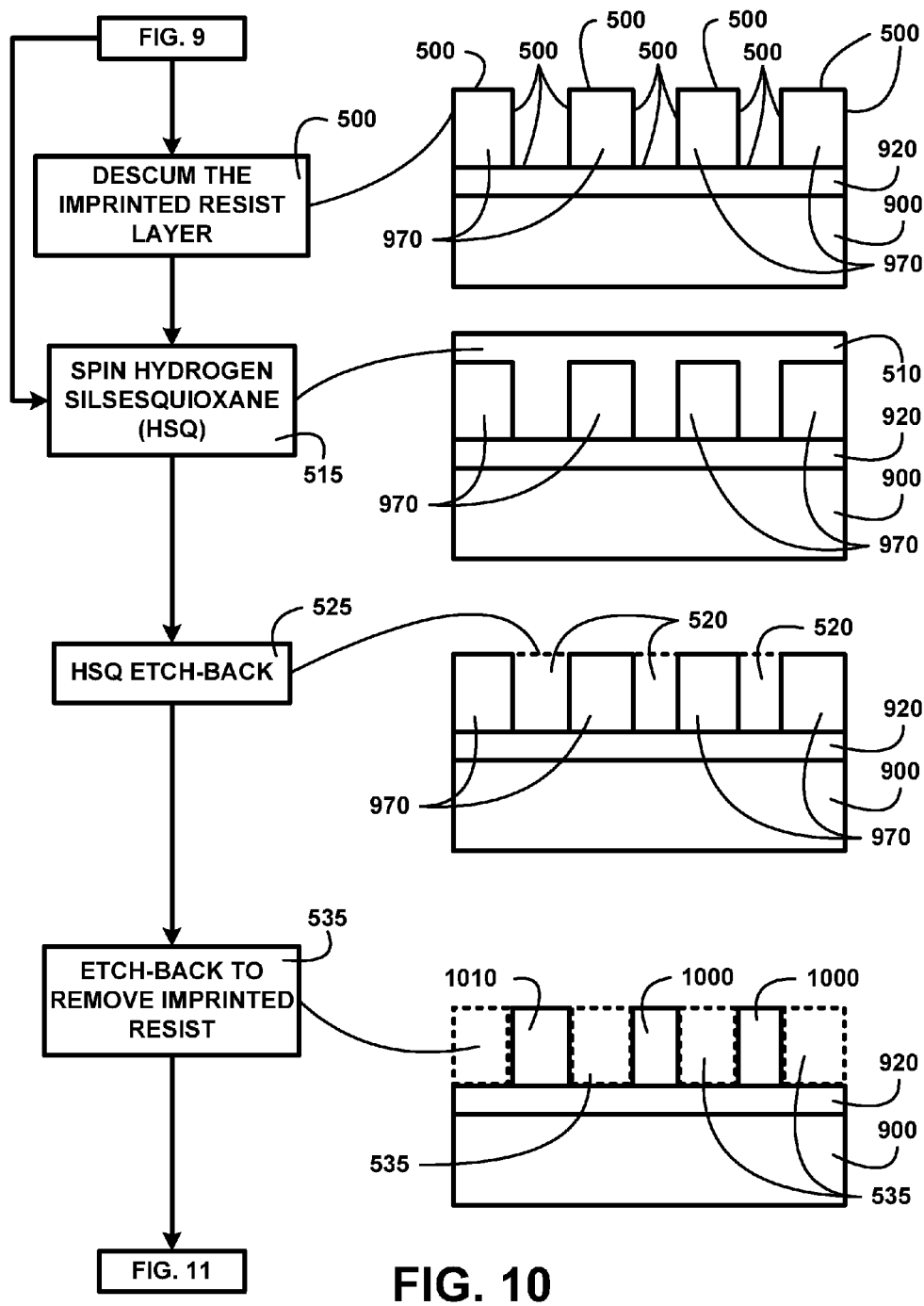
FIG. 10 shows for illustrative purposes only an example of HSQ small servo etching mask process of one embodiment.

HSQ Small Servo Etching Masks Process:

FIG. 10 shows for illustrative purposes only an example of HSQ small servo etching mask process of one embodiment. Continuing from FIG. 9, FIG. 10 shows processes which may include a process to descum the imprinted resist layer 500. The descum process removes possible contaminates from the imprinted resist layer 970 and amorphous-carbon (a-C) image layer 920 on the silicon substrate 900 which may interfere with subsequent processes of one embodiment.

A process proceeds to spin hydrogen silsesquioxane (HSQ) 515 over the imprinted resist layer 970 and exposed surfaces of the amorphous-carbon (a-C) image layer 920. The spun HSQ 510 reaches a level above the imprinted resist layer 970. A HSQ etch-back 525 lowers the level of the etched HSQ 520 to match the level of the imprinted resist layer 970 of one embodiment.

An etch-back to remove imprinted resist 535 exposes HSQ small servo mask 1010 and HSQ low-frequency data mask 1000 structures. The mask structures leave portions of the surface of the amorphous-carbon (a-C) image layer 920 exposed. Processing continues as described in FIG. 11 of one embodiment.

Figure 11:
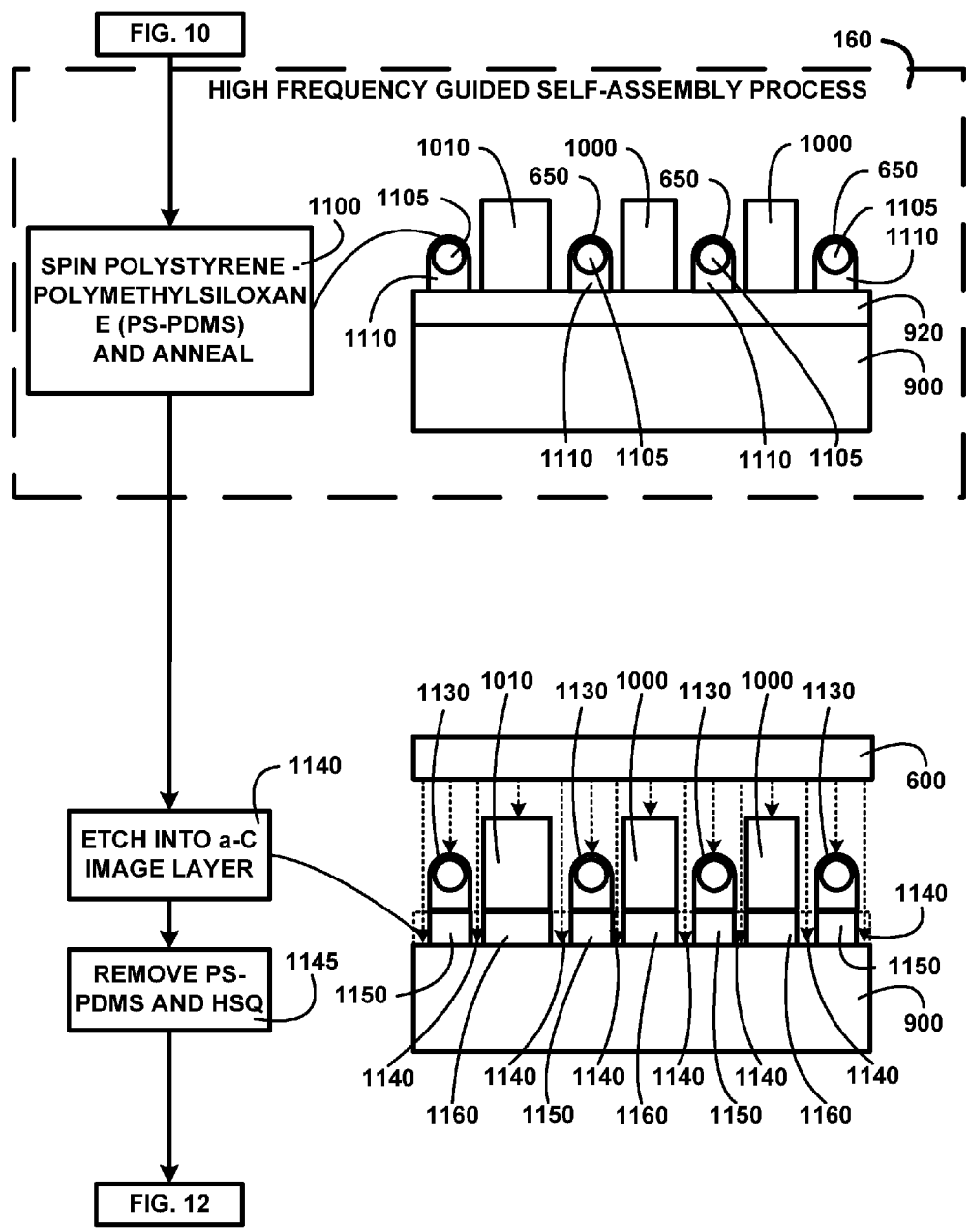
FIG. 11 shows for illustrative purposes only an example of a small servo high frequency guided self-assembly process of one embodiment.

Small Servo High Frequency Guided Self-Assembly Process:

FIG. 11 shows for illustrative purposes only an example of a small servo high frequency guided self-assembly process of one embodiment. FIG. 10 described the formation of the mask structures. The next step is the high frequency guided self-assembly process 160. The high frequency guided self-assembly process 160 begins with a process to spin polystyrene-polymethylsiloxane (PS-PDMS) and anneal 1100. The PS-PDMS is spun onto the exposed surfaces of the amorphous-carbon (a-C) image layer 920 of one embodiment.

The upper sections of the PS-PDMS structures include polymethylsiloxane (PDMS) 1105 and the lower sections include polystyrene (PS) 1110. The high density PS-PDMS structures set between the HSQ small servo mask 1010 and HSQ low-frequency data mask 1000 structures. The masks on the amorphous-carbon (a-C) image layer 920 are used in an etching process of the image layer of one embodiment.

An ion beam etching process 600 etches into a-C image layer 1140. The etching is followed by processes to remove PS-PDMS and HSQ 1145. The removal of the HSQ small servo mask 1120, HSQ data mask 1125 and PS-PDMS data mask 1130 exposes the etched a-C image layer high frequency data mask 1150 and etched a-C image layer low frequency small servo mask 1160. Processes continue as described in FIG. 12 of one embodiment.

Figure 12:
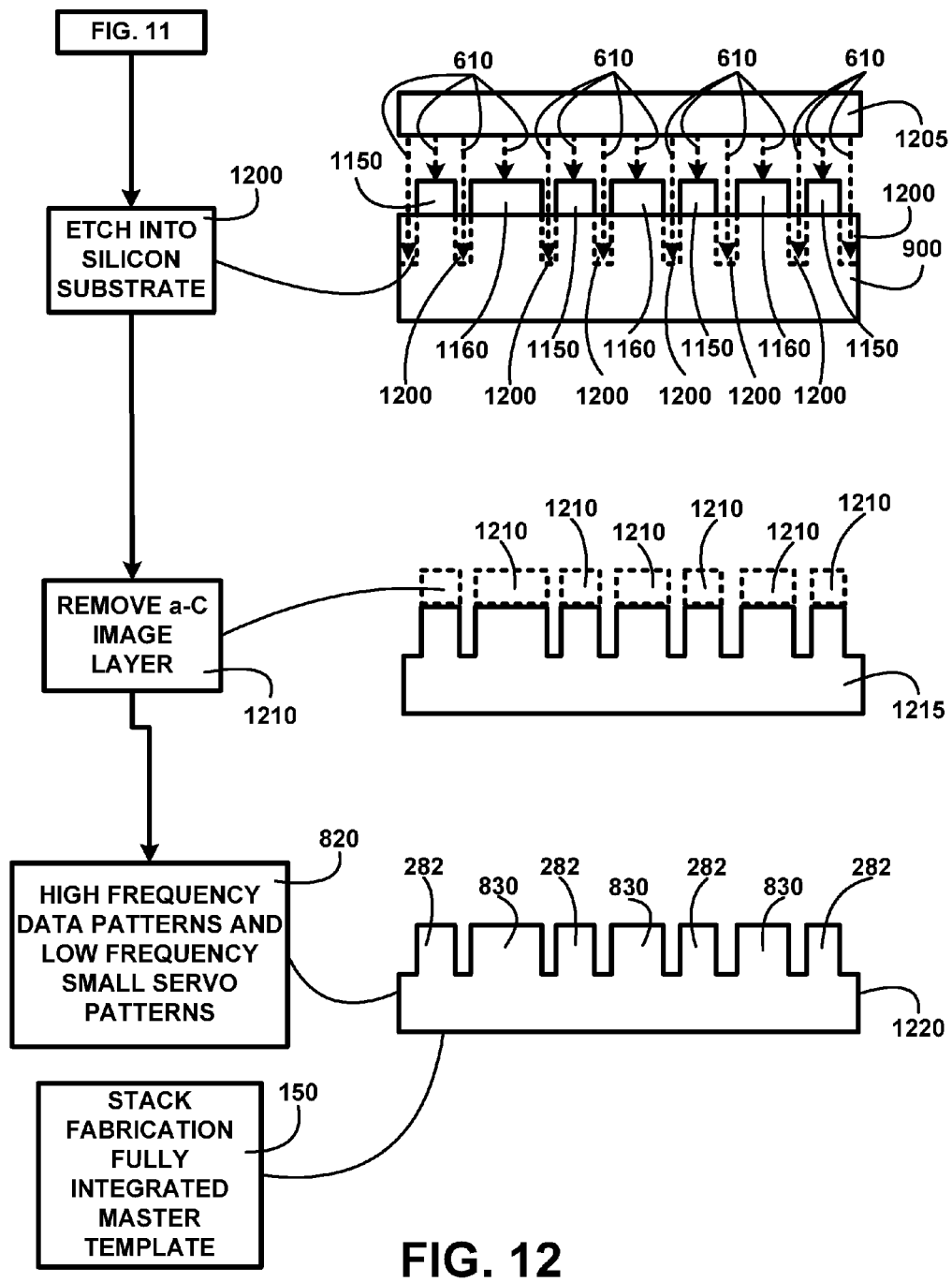
FIG. 12 shows for illustrative purposes only an example of a small servo stack fabrication master template process of one embodiment.

Small Servo Stacks Fabrication Master Template Process:

FIG. 12 shows for illustrative purposes only an example of a small servo stack fabrication master template process of one embodiment. FIG. 12 shows an e-beam lithography process using an ion beam etching process 1205 that projects an ion beam 610 to etch into silicon substrate 1200. The etched a-C image layer high frequency data mask 1150 and etched a-C image layer low frequency small servo mask 1160 protect the silicon substrate 900 from undesired etching. A process is used to remove a-C image layer 1210 and expose the etched silicon substrate 1215 of one embodiment.

The etched silicon substrate 1215 includes the high frequency data patterns and low frequency small servo patterns 820. The etched silicon substrate 1215 forms the small servo-field high-frequency master template 1220. The low frequency small servo information encoded servo field patterns in a high frequency background 830 of FIG. 8B and high-frequency data field patterns 282 form the fully integrated stack fabrication master template 150. Highly accurate fabrication of patterned stacks for example bit-patterned stacks is achievable using the method of self-aligned fully integrated stack fabrication of one embodiment.

The foregoing has described the principles, embodiments and modes of operation. However, the invention should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. A method, comprising:
   etching a first pattern into a mask,
      wherein the first pattern comprises a first set of features corresponding to features of an imprint template, wherein
         the first set of features overlies a substrate, and
         the substrate includes exposed portions between the first set of features;
   forming a second set of features on the first set of features and on the exposed portions of the substrate by directed self-assembly of a block copolymer composition, wherein
         the first and second sets of features combine to form a second pattern between individual features of the first and second sets of features, and
         the second pattern includes a portion of the exposed portions of the substrate; and
   etching the second pattern between individual features of the first and second sets of features into the substrate.

2. The method of claim 1,
   wherein the first set of features topographically guides the directed self-assembly of the block copolymer composition.

3. The method of claim 1,
   wherein a first subset of the first set of features is larger and lower frequency relative to a second subset of the first set of features.

4. The method of claim 3,
   wherein forming the second set of features comprises forming a first subset of the second set of features over the first subset of the first set of features, and
   wherein a combination of the foregoing features comprises features commensurate with the first subset of the first set of features.

5. The method of claim 4,
   wherein etching the second pattern into the substrate comprises etching the combination of the first subset of the second set of features and the first subset of the first set of features into the substrate to form features in the substrate.

6. The method of claim 1,
   wherein a second subset of the first set of features comprises smaller and higher frequency features relative to a first subset of the first set of features.

7. The method of claim 6,
   wherein forming the second set of features comprises forming a second subset of the second set of features in-between the second subset of the first set of features, and
   wherein a combination of the foregoing features comprises smaller features with a greater frequency relative to the second subset of the first set of features.

8. The method of claim 7,
   wherein etching the second pattern into the substrate comprises etching the combination of the second subset of the second set of features and the second subset of the first set of features into the substrate to form features in the substrate.

9. The method of claim 1,
   wherein the mask comprises chromium or amorphous carbon;
   wherein the block copolymer composition comprises polystyrene-block-poly(dimethylsiloxane), polystyrene-block-poly(methyl methacrylate), or polystyrene-block-poly(ethylene oxide); and
   wherein the substrate comprises quartz or silicon.

10. A method, comprising:
    etching a first pattern into a mask, wherein
       the etching exposes portions of an underlying material,
       the first pattern comprises
          a first subset of a first set of features corresponding to features of an imprint template and
          a second subset of the first set of features corresponding to smaller and higher frequency features relative to the first subset of the first set of features, and
          the first set of features overlies the underlying material;
    forming a second set of features over and in-between the first set of features by directed self-assembly of a block copolymer composition, wherein
       the first and second sets of features combine to form a second pattern between individual features of the first and second sets of features, and
       the second pattern includes a portion of the exposed portions of the underlying material; and
    etching the second pattern between individual features of the first and second sets of features into the underlying material.

11. The method of claim 10,
    wherein forming the second set of features comprises forming a first subset of the second set of features over the first subset of the first set of features, and
    wherein the foregoing features comprise a first combination of features commensurate with the first subset of the first set of features.

12. The method of claim 11,
    wherein forming the second set of features further comprises forming a second subset of the second set of features in-between the second subset of the first set of features, and
    wherein the foregoing features comprise a second combination of smaller features with a greater frequency relative to the second subset of the first set of features.

13. The method of claim 12,
    wherein etching the second pattern into the underlying material comprises simultaneously etching the first and second combinations of features into the underlying material, wherein further the first combination of features is larger than the second combination of features.

14. The method of claim 13,
    wherein the mask comprises chromium or amorphous carbon;
    wherein the block copolymer composition comprises polystyrene-block-poly(dimethylsiloxane), polystyrene-block-poly(methyl methacrylate), or polystyrene-block-poly(ethylene oxide); and
    wherein the underlying material comprises a substrate of quartz or silicon.

15. The method of claim 14, further comprising removing the block copolymer composition and the mask to form a master template for fabrication of bit-patterned media ("BPM"), wherein BPM servo fields are larger and lower frequency relative to BPM data fields.

16. A method, comprising:

forming a first pattern in a resist over a mask, wherein the first pattern comprises a first set of features corresponding to features of an imprint template;

forming a second set of features in-between the first set of features by directed self-assembly of a block copolymer composition, wherein the first and second sets of features combine to form a second pattern between individual features of the first and second sets of features, wherein the second pattern includes exposed portions of an underlying material; and etching the second pattern between individual features of the first and second sets of features into the underlying material.

17. The method of claim 16, wherein forming the second set of features comprises topographically guiding the directed self-assembly of the block copolymer composition with the first set of features.

18. The method of claim 16, wherein the first set of features comprises larger and lower frequency features relative to the second set of features and correspond to one of more servo fields in a bit-patterned medium.

19. The method of claim 16, wherein the second set of features comprises smaller and higher frequency features relative to at least a portion of the first set of features and correspond to one of more data fields in a bit-patterned medium.

20. The method of claim 16, wherein the resist comprises hydrogen silsesquioxane;

wherein the mask comprises chromium or amorphous carbon;

wherein the block copolymer composition comprises polystyrene-block-poly(dimethylsiloxane), polystyrene-block-poly(methyl methacrylate), or polystyrene-block-poly(ethylene oxide); and wherein the underlying material comprises a substrate of quartz or silicon.

* * * * *